US010318156B2

(12) United States Patent
Ash et al.

(10) Patent No.: US 10,318,156 B2
(45) Date of Patent: *Jun. 11, 2019

(54) INVOKING INPUT/OUTPUT (I/O) THREADS ON PROCESSORS TO DEMOTE TRACKS FROM A CACHE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Trung N. Nguyen, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/027,252

(22) Filed: Jul. 3, 2018

(65) Prior Publication Data

US 2018/0314432 A1 Nov. 1, 2018

Related U.S. Application Data

(63) Continuation of application No. 15/937,753, filed on Mar. 27, 2018, now Pat. No. 10,082,958, which is a (Continued)

(51) Int. Cl.
*G06F 12/00* (2006.01)
*G06F 3/06* (2006.01)
(Continued)

(52) U.S. Cl.
CPC ............ *G06F 3/0605* (2013.01); *G06F 3/067* (2013.01); *G06F 3/0653* (2013.01);
(Continued)

(58) Field of Classification Search
CPC ............... G06F 12/0817; G06F 12/084; G06F 12/0891; G06F 2212/1024; G06F 12/60; G06F 12/621; G06F 12/69
See application file for complete search history.

(56) References Cited

U.S. PATENT DOCUMENTS

| 5,627,990 A | 5/1997 | Cord et al. |
| 5,933,368 A | 8/1999 | Ma et al. |

(Continued)

OTHER PUBLICATIONS

U.S. Appl. No. 15/174,829, filed Jun. 6, 2016.
(Continued)

*Primary Examiner* — Shawn X Gu
(74) *Attorney, Agent, or Firm* — David W. Victor; Konrad Raynes Davda & Victor LLP

(57) ABSTRACT

Provided are a computer program product, system, and method for invoking Input/Output (I/O) threads on processors to demote tracks from a cache. An Input/Output (I/O) thread, executed by a processor, processes I/O requests directed to tracks in the storage by accessing the tracks in the cache. After processing at least one I/O request, the I/O thread determines whether a number of free cache segments in the cache is below a free cache segment threshold. The I/O thread processes a demote ready list, indicating tracks eligible to demote from the cache, to demote tracks from the cache in response to determining that the number of free cache segments is below the free cache segment threshold. The I/O thread continues to process I/O requests directed to tracks from the storage stored in the cache after processing the demote ready list to demote tracks in the cache.

21 Claims, 8 Drawing Sheets

Related U.S. Application Data continuation of application No. 15/174,744, filed on Jun. 6, 2016, now Pat. No. 9,971,508.

(51) Int. Cl.

| | |
|---|---|
| *G06F 12/0804* | (2016.01) |
| *G06F 12/084* | (2016.01) |
| *G06F 12/0842* | (2016.01) |
| *G06F 12/123* | (2016.01) |
| *G06F 12/0866* | (2016.01) |
| *G06F 12/0817* | (2016.01) |
| *G06F 12/0891* | (2016.01) |

(52) U.S. Cl.
CPC .......... *G06F 3/0659* (2013.01); *G06F 12/084* (2013.01); *G06F 12/0804* (2013.01); *G06F 12/0817* (2013.01); *G06F 12/0842* (2013.01); *G06F 12/0866* (2013.01); *G06F 12/0891* (2013.01); *G06F 12/123* (2013.01); *G06F 12/124* (2013.01); *G06F 2212/1024* (2013.01); *G06F 2212/60* (2013.01); *G06F 2212/621* (2013.01)

(56) References Cited

U.S. PATENT DOCUMENTS

| | | |
|---|---|---|
| 6,327,644 B1 | 12/2001 | Beardsley et al. |
| 6,615,318 B2 | 9/2003 | Jarvis et al. |
| 7,260,679 B2 | 8/2007 | Benhase et al. |
| 9,384,143 B1 | 7/2016 | Ash et al. |
| 9,952,982 B2 | 4/2018 | Ash et al. |
| 9,971,508 B2 | 5/2018 | Ash et al. |
| 9,971,689 B2 | 5/2018 | Ash et al. |
| 2003/0105928 A1 | 6/2003 | Ash et al. |
| 2006/0080510 A1 | 4/2006 | Benhase et al. |
| 2008/0021853 A1 | 1/2008 | Modha et al. |
| 2008/0250200 A1 | 10/2008 | Jarvis et al. |
| 2010/0153652 A1 | 6/2010 | Thomas et al. |
| 2012/0303861 A1 | 11/2012 | Benhase et al. |
| 2012/0303875 A1 | 11/2012 | Benhase et al. |
| 2012/0303898 A1 | 11/2012 | Ash et al. |
| 2012/0303904 A1 | 11/2012 | Ash et al. |
| 2015/0026409 A1* | 1/2015 | Ash ................... G06F 12/123 711/133 |
| 2017/0052822 A1 | 2/2017 | Ash et al. |
| 2017/0052897 A1 | 2/2017 | Ash et al. |
| 2017/0052898 A1 | 2/2017 | Ash et al. |
| 2017/0052902 A1 | 2/2017 | Ash et al. |
| 2017/0052903 A1 | 2/2017 | Ash et al. |
| 2017/0124000 A1 | 5/2017 | Ash et al. |
| 2017/0124001 A1 | 5/2017 | Ash et al. |
| 2017/0139841 A1 | 5/2017 | Ash et al. |
| 2017/0344493 A1 | 11/2017 | Ash et al. |
| 2017/0351432 A1 | 12/2017 | Ash et al. |
| 2017/0351611 A1 | 12/2017 | Ash et al. |
| 2017/0351619 A1 | 12/2017 | Ash et al. |

OTHER PUBLICATIONS

Office Action dated Jun. 28, 2017, pp. 13, for U.S. Appl. No. 15/174,829, filed Jun. 6, 2016.
Response dated Sep. 28, 2017, pp. 11, to Office Action dated Jun. 28, 2017, pp. 13, for U.S. Appl. No. 15/174,829, filed Jun. 6, 2016.
Notice of Allowance dated Dec. 14, 2017, pp. 12, for U.S. Appl. No. 15/174,829, filed Jun. 6, 2016.
U.S. Appl. No. 15/904,294, filed Feb. 23, 2018.
U.S. Appl. No. 15/174,744, filed Jun. 6, 2016.
Office Action dated Sep. 8, 2017, pp. 24, for U.S. Appl. No. 15/174,744, filed Jun. 6, 2016.
Response dated Dec. 8, 2017, pp. 12, to Office Action dated Sep. 8, 2017, pp. 24, for U.S. Appl. No. 15/174,744, filed Jun. 6, 2016.
Notice of Allowance dated Jan. 12, 2018. pp. 11, for U.S. Appl. No. 15/174,744, filed Jun. 6, 2016.
U.S. Appl. No. 15/937,753, filed Mar. 27, 2018.
Notice of Allowance dated May 10, 2018, pp. 19, for U.S. Appl. No. 15/937,753, filed.
U.S. Appl. No. 15/174,692, filed Jun. 6, 2016.
Office Action dated Sep. 8, 2017, pp. 17, for U.S. Appl. No. 15/174,692, filed Jun. 6, 2016.
Response dated Dec. 8, 2017, pp. 11, to Office Action dated Sep. 8, 2017, pp. 17, for U.S. Appl. No. 15/174,692, filed Jun. 6, 2016.
Notice of Allowance dated Jan. 12, 2018, pp. 11, for U.S. Appl. No. 15/174,692, filed Jun. 6, 2016.
List of IBM Patents or Patent Applications Treated as Related dated 2018-07-xx, pp. 2.

* cited by examiner

Cache Control Block

Demote Parameters

I/O Thread Info

INVOKING INPUT/OUTPUT (I/O) THREADS ON PROCESSORS TO DEMOTE TRACKS FROM A CACHE

BACKGROUND OF THE INVENTION

1. Field of the Invention

The present invention relates to a computer program product, system, and method for invoking Input/Output (I/O) threads on processors to demote tracks from a cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

To avoid the cache from becoming full and no free cache segments available for further I/O requests, tracks need to be demoted, i.e., removed from cache or invalidated in cache, to make room for new cache segment allocations for further accessed tracks. The active LRU cache list is scanned to determine unmodified tracks to move to a demote ready LRU list from where they will be demoted, i.e., removed. If the demote scan operation encounters modified tracks, the demote scan initiates a destaging operation of the modified track, and skips the modified track to process further tracks on the active LRU cache list. A destage operation writes the modified track to the storage while leaving the track in the cache.

There is a need in the art for improved techniques for selecting tracks for demotion from the cache.

SUMMARY

Provided are a computer program product, system, and method for invoking Input/Output (I/O) threads on processors to demote tracks from a cache. An Input/Output (I/O) thread, executed by a processor, processes I/O requests directed to tracks in the storage by accessing the tracks in the cache. After processing at least one I/O request, the I/O thread determines whether a number of free cache segments in the cache is below a free cache segment threshold. The I/O thread processes a demote ready list, indicating tracks eligible to demote from the cache, to demote tracks from the cache in response to determining that the number of free cache segments is below the free cache segment threshold. The I/O thread continues to process I/O requests directed to tracks from the storage stored in the cache after processing the demote ready list to demote tracks in the cache.

DETAILED DESCRIPTION

In a storage controller having multiple processors and processing I/O request from multiple host systems to access storage volumes managed by the storage controller, the storage controller will invoke numerous I/O threads across the processors to handle the I/O requests. The numerous I/O threads will allocate cache segments in a cache to store requested tracks. If there is only one demote thread demoting tracks from a demote ready list, then the rate at which cache segments are consumed by the numerous I/O threads processing I/O requests will far exceed the rate at which tracks are demoted from the cache, resulting in I/O requests having to be queued or delayed until cache segments are freed.

Described embodiments provide techniques to increase the rate at which tracks are demoted from cache to avoid the cache from being depleted of free cache segments by maintaining multiple demote ready lists on different processors that may be independently processed to demote tracks from the cache. With the described embodiments, the demote ready lists may be processed by demote threads that may run on the processors to demote tracks from cache, by I/O threads executing I/O requests that run on different processors, and by a combination of I/O threads and demote threads.

In one embodiment, in response to determining that a number of free cache segments in the cache is below a free cache segment threshold, a number of demote threads is determined to invoke on processors based on the number of free cache segments and the free cache segment threshold. The determined number of demote threads are invoked to demote tracks in the cache indicated in the demote ready lists. Each invoked demote thread processes one of the demote ready lists to select tracks to demote from the cache to free cache segments in the cache.

In a further embodiment, after an Input/Output (I/O) thread, executed by a processor, processes at least one I/O request, the I/O thread may determine whether a number of free cache segments in the cache is below a free cache segment threshold. If so, the I/O thread may process a demote ready list to demote tracks from the cache. The I/O thread may continue processing I/O requests directed to tracks from the storage stored in the cache after processing the demote ready list to demote tracks in the cache.

In a still further embodiment, a demote thread, executed by a processor, processes a demote ready list, indicating tracks eligible to demote from cache, to select tracks to demote from the cache to free cache segments in the cache. After processing a number of I/O requests, an I/O thread processing I/O requests processes the demote ready list to demote tracks from the cache in response to determining that a number of free cache segments in the cache is below a free cache segment threshold.

Figure 1:
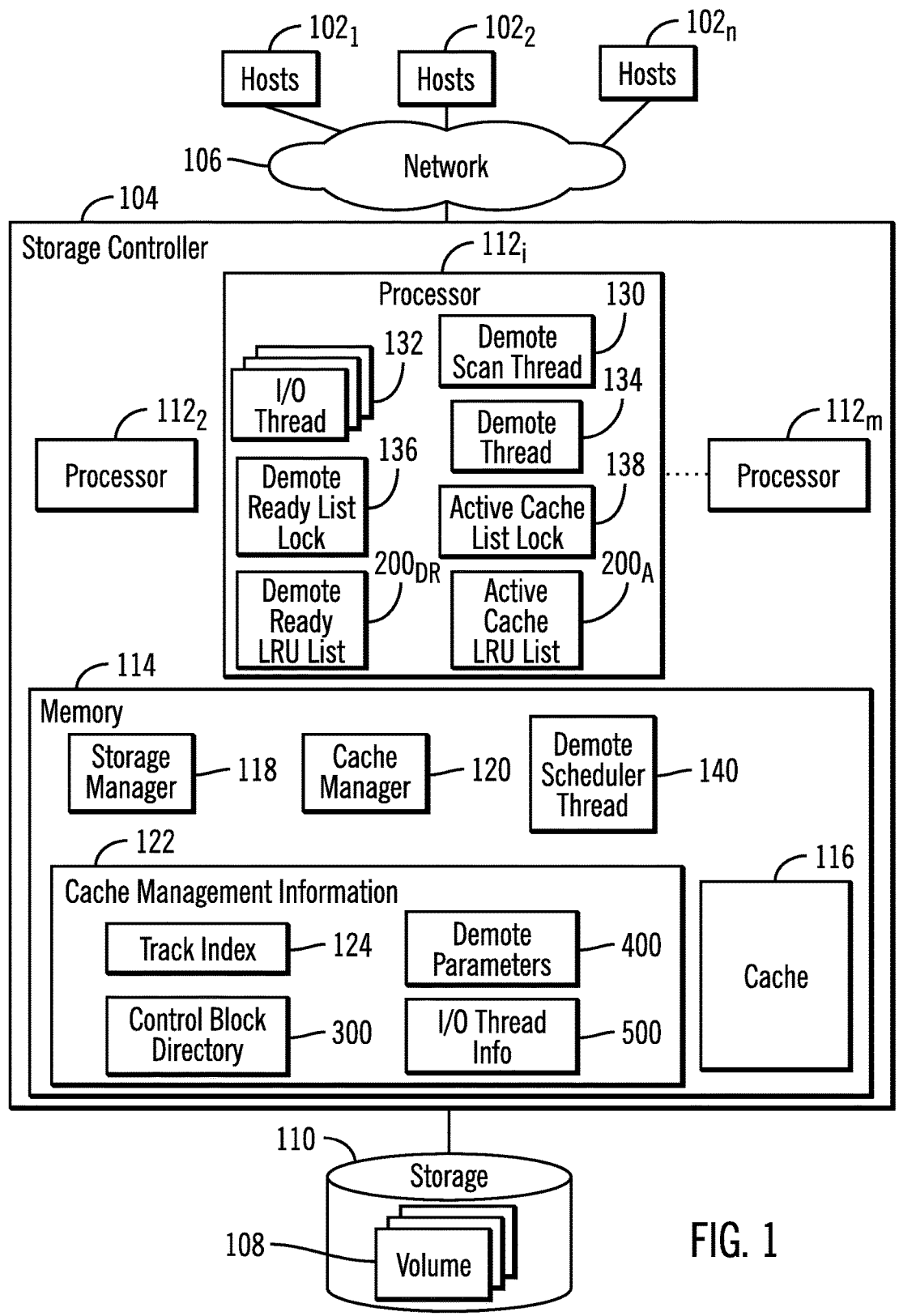
FIG. 1 illustrates an embodiment of a computing environment.

FIG. 1 illustrates an embodiment of a computing environment. A plurality of hosts $102_1$, $102_2$ ... $102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes a plurality of processors $112_1$, $112_2$ ... $112_m$ and a memory 114, including a cache 116 to cache data for the storage 110. The processors $112_1$, $112_2$ ... $112_m$ may each comprise a group of separate central processing units (CPU), a processor core having a plurality of CPUs on the core, or other types of processing units capable of concurrently executing multiple tasks and threads. The cache 116 buffers data transferred between the hosts $102_1$, $102_2$ ... $102_n$ and volumes 108 in the storage 110.

The memory 114 further includes a storage manager 118 for managing the transfer of tracks transferred between the hosts $102_1$, $102_2$ ... $102_n$ and the storage 110 and a cache manager 120 that manages data transferred between the hosts $102_1$, $102_2$ ... $102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300. The control block directory 300 includes the cache control blocks, where there is one cache control block for each track in the cache 116 providing metadata on the track in the cache 116. The track index 124 associates tracks with the cache control blocks providing information on the tracks in the cache.

The cache management information 122 may further comprise demote parameters 400 providing parameters used to determine when to perform demote operations with respect to the demote ready LRU list $200_{DR}$ instances in the processors $112_1$, $112_2$ ... $112_m$. Each I/O thread 132 may further maintain an instance of I/O thread information 500 in the processor $112_i$ executing the I/O thread 132 for use in controlling I/O thread 132 operations. Cache management information 122 may be maintained local in the processors $112_1$, $112_2$ ... $112_m$ and/or in the memory 114.

Each of the processors $112_1$, $112_2$ ... $112_m$, as shown with respect to processor $112_i$, maintain an instance of an active cache LRU list $200_A$ and a demote ready list $200_{DR}$. Each active cache LRU list $200_A$ in the processors $112_1$, $112_2$ ... $112_m$ indicates a partition of unmodified and modified tracks from the storage 110 stored in the cache 116, including customer data, and metadata for customer data maintained in the cache. Each metadata track may provide information on numerous customer data tracks in the storage 110. The combination of all the instances of active cache LRU lists $200_A$ in each of the processors $112_1$, $112_2$ ... $112_m$ indicates all the tracks in the cache 116.

Each demote ready list $200_{DR}$ in a processor $112_i$ indicates tracks from the active cache LRU list $200_A$ for that processor $112_i$ that are now eligible for demotion from the cache 116. Each processor $112_i$ executes a demote scan thread 130 that scans its active LRU cache list $200_A$ to locate unmodified tracks to move to the demote ready list $200_{DR}$ for that processor $112_i$ from which tracks are demoted from the cache 116. When a track is demoted it is removed from cache 116, or invalidated so the cache segments that stored the invalidated track can be reused.

Each processor $112_1$, $112_2$ ... $112_m$, as shown with respect to processor $112_i$, executes one or more Input/Output ("I/O") threads 132 and a demote thread 134. Each I/O thread 132 process read and write requests with respect to tracks in the cache 116. An I/O thread 132 stores modified tracks received from write I/O requests in the cache 116 by allocating cache segments in the cache 116 for the modified tracks and indicates the modified tracks in the cache 116 in the active cache LRU list $200_A$. In this way, each processor $112_1$, $112_2$ ... $112_m$ independently manages a partition or portion of the tracks in the cache 116.

Each processor $112_1$, $112_2$ ... $112_m$, as shown with respect to processor $112_i$, further maintains a demote ready list lock 136 to serialize access to the demote ready list $200_{DR}$ by the demote scan thread 130, when adding tracks to the demote ready list $200_{DR}$, by the demote thread 134, and by I/O threads 132 when processing the demote ready list $200_{DR}$ to demote tracks from the cache 116.

Each processor $112_1$, $112_2$ ... $112_m$, as shown with respect to processor $112_i$, further maintains an active cache list lock 138 to serialize access to the active cache LRU list $200_A$ by the I/O threads 132 to process I/O requests and by the demote scan thread 130 to move indication of tracks from the active cache LRU list $200_A$ to the demote ready LRU list $200_{DR}$.

Lock contention is minimized by having each of the processors $112_1$, $112_2$ ... $112_m$ maintain their own locks 136 and 138 because there is no lock contention to access the LRU lists $200_A$ and $200_{DR}$ among processors, but only contention among threads executing within a processor $112_1$, $112_2$ ... $112_m$. When the lock 136 or 138 is being held while another thread requests the lock, the requesting thread can wait for the lock by continuing to submit requests for the lock until the lock is obtained or by queuing the request in a lock queue so that when the lock becomes available the oldest request in the queue is provided the lock.

One of the processors $112_1$, $112_2$ ... $112_m$ may execute a demote scheduler thread 140 that determines how many demote threads 134 to invoke on different processors $112_1$, $112_2$ ... $112_m$ to demote tracks from the cache 116 indicated in the demote ready LRU list $200_{DR}$ if the number of free cache segments in the cache 116 falls below a threshold. The demote scheduler thread 140 works to ensure that the cache 116 will not run out of free cache segments, which would cause I/O requests to be queued and have to wait until cache segments are freed for use by the I/O requests.

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

Figure 2:
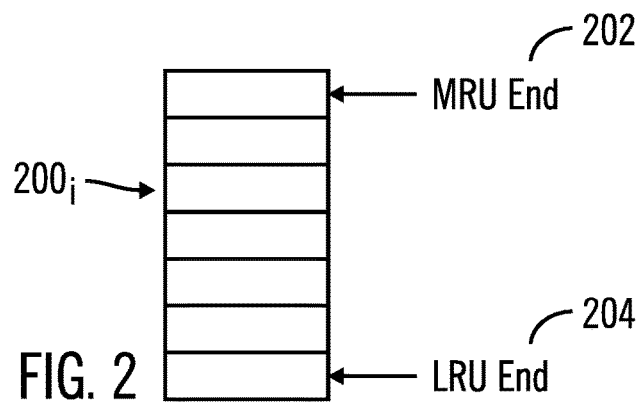
FIG. 2 illustrates an embodiment of a Least Recently Used (LRU) list.

FIG. 2 illustrates an embodiment of the lists $200_A$, $200_{DR}$, each as a Least Recently Used (LRU) list, having a most recently used (MRU) end 202 identifying a track most recently added to the cache 116 or most recently accessed in the cache 116 and a least recently used (LRU) end 204 from which the track identified at the LRU end 204 is selected to remove from the LRU list 200. The LRU end 204 points to a track identifier, such as a track identifier address or a cache control block index for the track, of the track that has been in the cache 116 the longest for tracks indicated in that list $200_A$, $200_{DR}$. As a track is added to the MRU end 202, other tracks move downward toward the LRU end 204. If there is not sufficient space for the track being added to the MRU end 202, then a track may be demoted from the LRU end 204 to make room for the new track being added.

Figure 3:
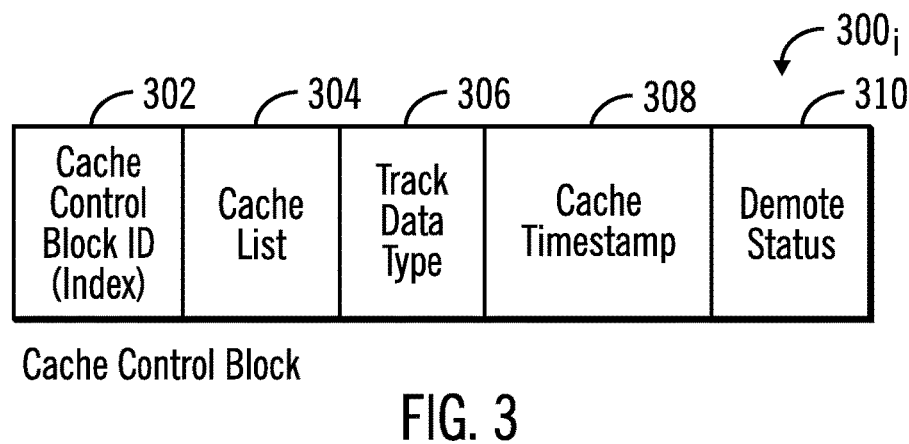
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_A$, $200_{DR}$ in which the track associated cache control block $300_i$ is indicated; a track data type 306, such as unmodified sequentially accessed track, unmodified non-sequentially accessed track, etc.; a cache timestamp 308 indicating a time the track was added to the cache 116; a demote status 310 indicating whether the track identified by the cache control block $300_i$ is to be demoted from the cache 116 and indicated in the demote ready LRU list $200_{DR}$.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
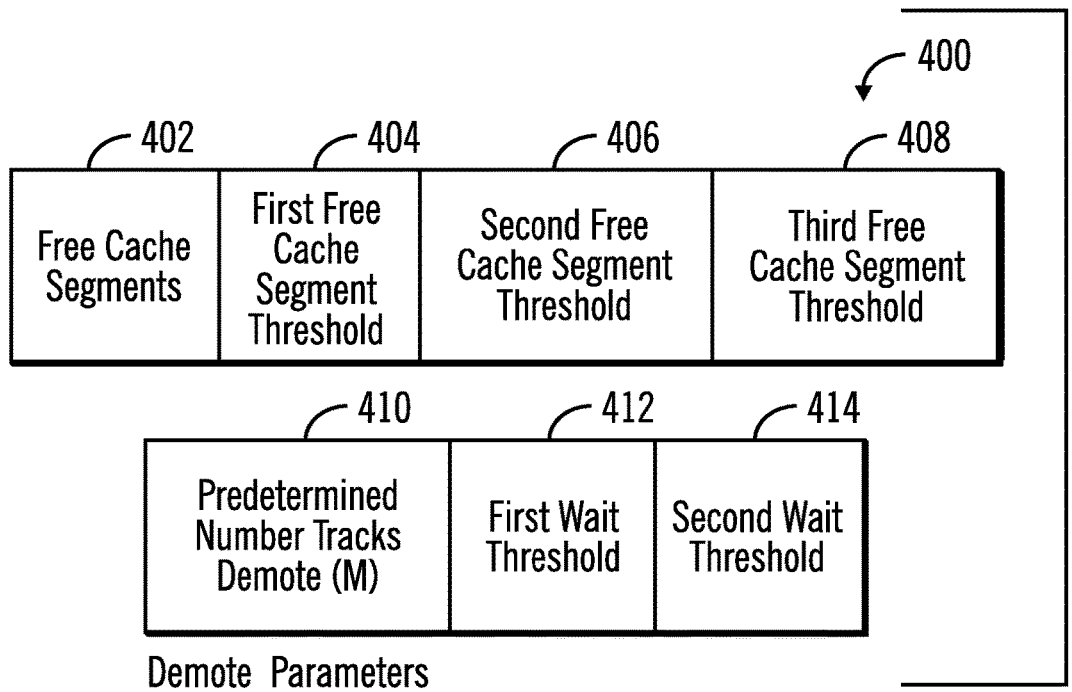
FIG. 4 illustrates an embodiment of demote parameters used to control operations to demote tracks from the cache.

FIG. 4 illustrates an embodiment of demote parameters 400 used by the different I/O threads 132 and demote threads 134 executing in the processors $112_1, 112_2 \ldots 112_m$, which parameters may comprise default parameters or configured by a user. The demote parameters 400 include a free cache segments 402 updated to indicate a number of free and available cache segments in the cache 116; a first free cache segment threshold 404, a second free cache segment threshold 406, and a third free cache segment threshold 408 used by the demote scheduler thread 140 to determine how many demote threads 134 to invoke on different processors $112_1, 112_2 \ldots 112_m$, where the first free cache segment threshold 404 is less than the second free cache segment threshold 406, which is less than the third free cache segment threshold 408; a predetermined number of tracks to demote (M) 410 that are demoted by the I/O threads 132 when demoting tracks from the demote ready LRU list $200_{DR}$; a first wait threshold 412 and second wait threshold 414 used by the I/O threads 132 to determine whether to wait for the demote ready list lock 136 to demote threads from the demote ready LRU list $200_{DR}$. The first 412 and second 414 wait threshold may comprise first and second percentages of the first cache segment threshold 404, or some other values, at which action must be taken to demote tracks from the cache 116 to prevent the cache 116 from running out of free cache segments to allocate to I/O requests.

Figure 5:
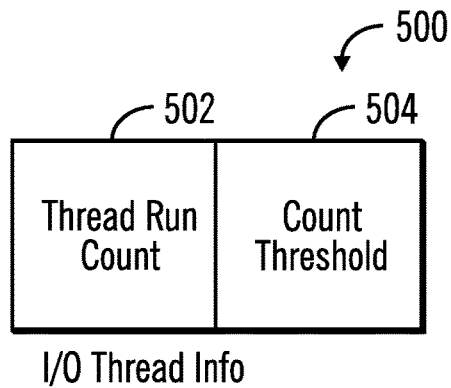
FIG. 5 illustrates an embodiment of Input/Output (I/O) thread information used by I/O threads processing I/O requests.

FIG. 5 illustrates I/O thread information 500 each I/O thread 132 executing in the processors $112_1, 112_2 \ldots 112_m$ maintains, including a thread run count 502 indicating a number of I/O requests the I/O thread 132 has processed or a number of cache segment allocations made by the I/O thread, and a count threshold 504 indicating a threshold that when reached by the thread run count 502 causes the I/O thread 132 to process the demote ready LRU list $200_{DR}$ to demote tracks from the cache 116.

Figure 6:
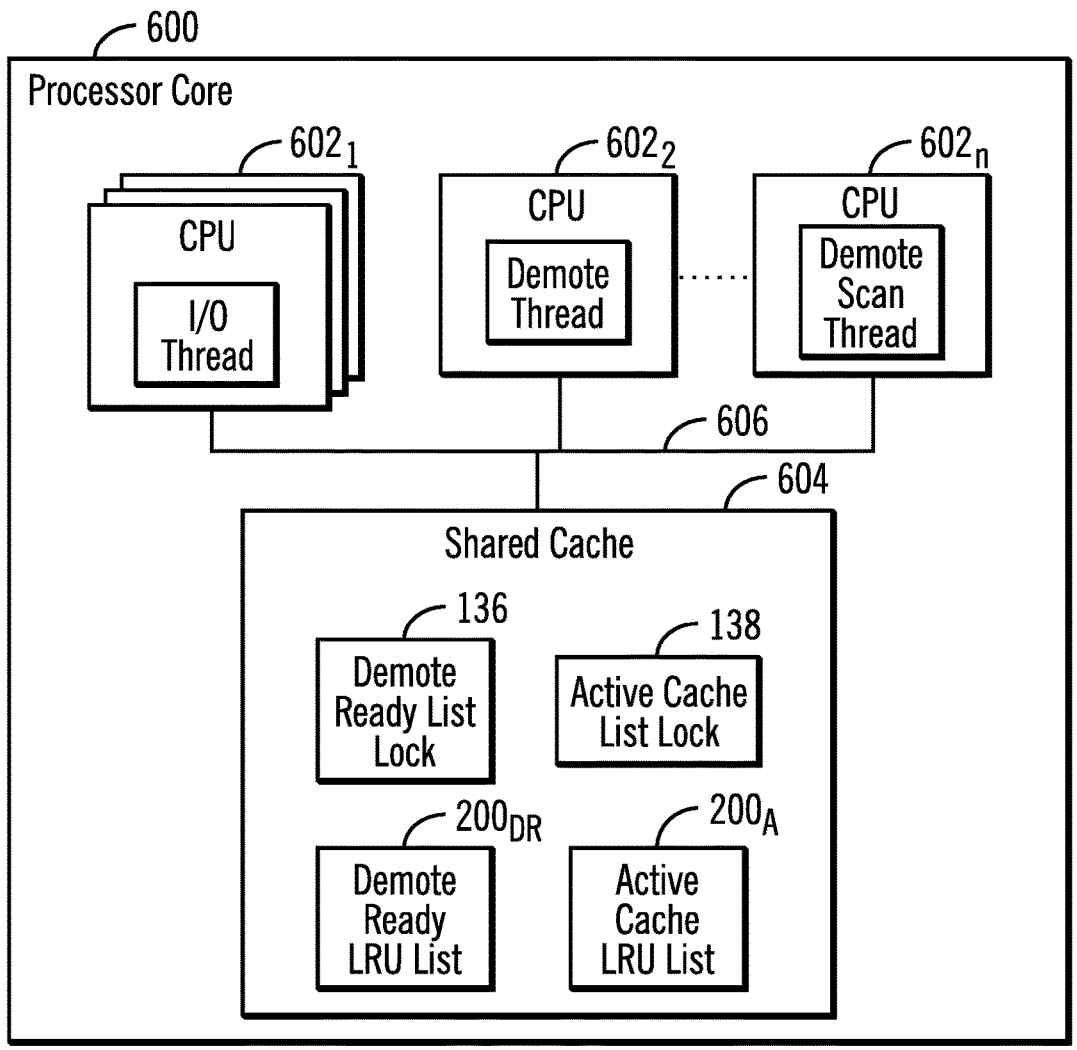
FIG. 6 illustrates an embodiment of a processor core having a demote ready list and active cache list.

FIG. 6 illustrates an embodiment of an implementation of each of the processors $112_1, 112_2 \ldots 112_m$ as a processor core 600, including a plurality of CPUs $602_1, 602_2 \ldots 602_n$ that may independently execute I/O threads 132, a demote thread 134, and a demote scan thread 130. CPU $602_1$ represents one or more CPUs that execute one or more instances of I/O threads 132. Each CPU $602_1, 602_2 \ldots 602_n$ may include a local L1 cache to store parameters and code to execute the threads 130, 132, and 134. The processor core 600 includes a shared cache 604 including the demote ready LRU list $200_{DR}$ and active cache LRU list $200_A$, as well as the locks 136 and 138. The CPUs may access the shared cache 604 over a processor bus 606.

Figure 7:
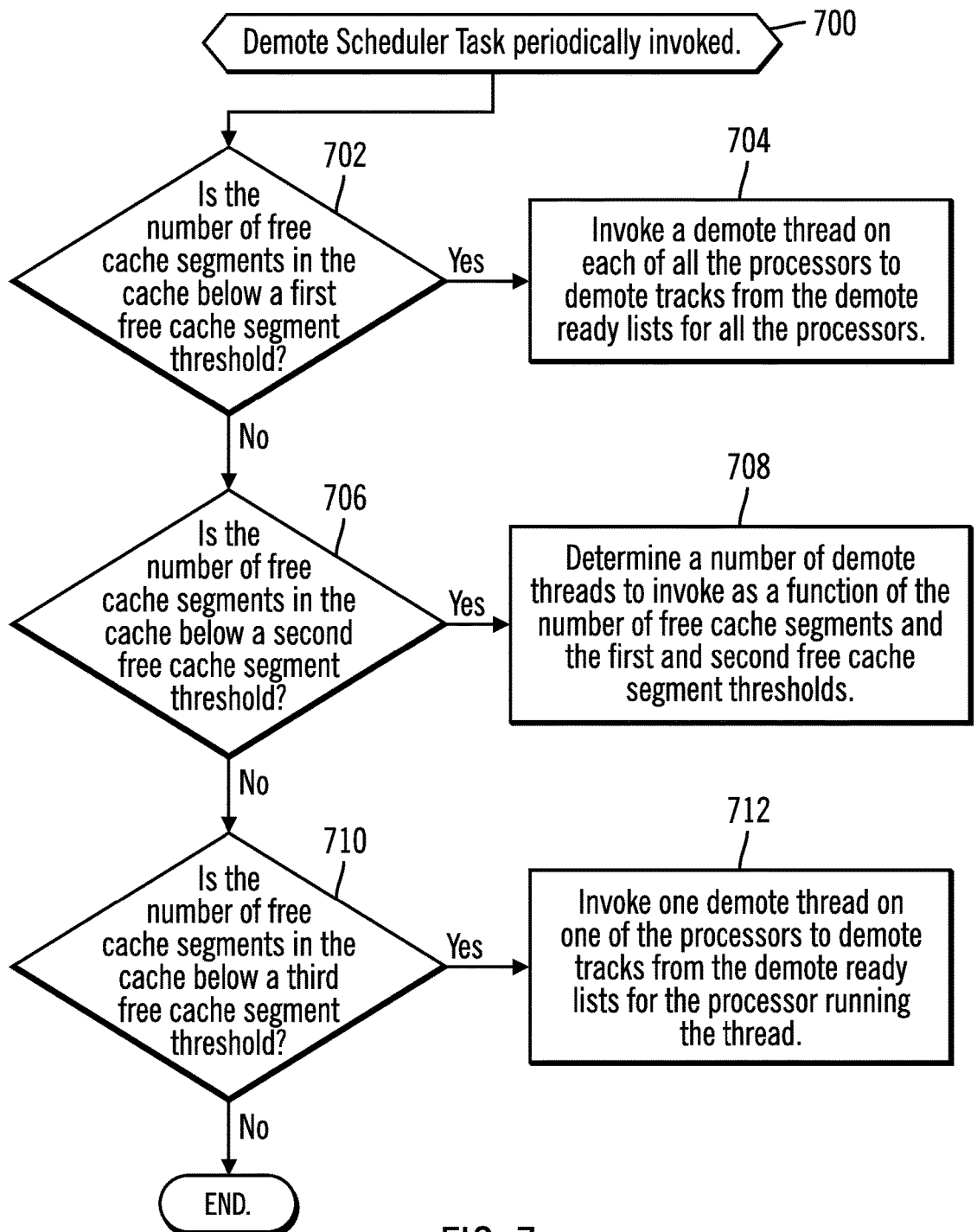
FIG. 7 illustrates an embodiment of operations to schedule demote threads to demote tracks from cache

FIG. 7 illustrates an embodiment of operations performed by the demote scheduler thread 140, executed by one of the processors $112_1, 112_2 \ldots 112_m$ to schedule demote threads 134 on one or more processors $112_1, 112_2 \ldots 112_m$ to demote tracks to free cache segments in the cache 116. The demote scheduler thread 140 may be periodically invoked or regularly check the free cache segments 402. Upon being invoked (at block 700) if (at block 702) the number of free cache segments 402 is below a first free cache segment threshold 404, then the demote scheduler thread 140 invokes (at block 704) a demote thread 134 on each of all the processors $112_1, 112_2 \ldots 112_m$ to demote tracks from all the demote ready lists $200_{DR}$. In this way, the first segment threshold 404 comprises a highest priority threshold for a lowest level of free cache segments in the cache 116 to trigger rapid action to free cache segments.

If (at block 702) the number of free cache segments is not below the first free cache segment threshold 404 but is between (at block 706) the first free cache segment threshold 404 and the second free cache segment threshold 406, then the demote scheduler thread 140 determines (at block 708)

a number of demote threads 134 to invoke as a function of the number of free cache segments 402 and the first 404 and second 406 free cache segment thresholds. For instance, the number to invoke may comprise a sliding scale that increases from two at the second threshold 406 towards one or two processors less than all of the processors $112_1$, $112_2 \ldots 112_m$. For instance the number of processors $112_1$, $112_2 \ldots 112_m$ to invoke to execute the demote thread 134 may comprise the total number of processors times a ratio calculated by the number of free cache segments 402 divided by the difference of the second free cache segment threshold 406 and the first free cache segment threshold 404, rounded up to the nearest integer if not an integer. The second free cache segment threshold 406 thus provides an intermediary level of action to trigger an intermediary number of demote threads 134 to demote from less than all the demote ready LRU lists $200_{DR}$. After determining a number of demote threads 134 to invoke, the demote scheduler thread 140 may select a subset of processors $112_1$, $112_2 \ldots 112_m$ to invoke the determined number of demote threads 134 based upon different selection techniques, such as round robin or select processors $112_1$, $112_2 \ldots 112_m$ that have a lowest current workload or highest number of eligible tracks to demote in their demote ready lists $200_{DR}$.

If (at block 710) the number of free cache segments 402 is less than the third free cache segment threshold 408, i.e., between the second 406 and third 408 free cache segment thresholds, then the demote scheduler thread 140 invokes (at block 712) one demote thread 134 on one of the processors $112_i$ to demote tracks from the demote ready list $200_{DR}$ for the processor $112_i$ running the demote thread 134. If (at block 710) the number of free cache segments 402 is above the third free cache segment threshold 408, then control ends without invoking any demote threads 134 on any of the processors $112_1$, $112_2 \ldots 112_m$. In this way, the third free cache segment threshold comprises a lowest threshold after which there are a sufficient number of free cache segments 402 available and no demotion is needed to free space in the cache 116.

With the described embodiments of FIG. 7 the demote scheduler thread 140 selects a number of processors $112_1$, $112_2 \ldots 112_m$ to execute the demote thread 134 to demote tracks from their own demote ready LRU lists $200_{DR}$ based on the current number of free cache segments 402 and various thresholds. If the number of free cache segments 402 are determined to be sufficiently low that action needs to be taken, then multiple demote threads 134 running against separate demote ready LRU lists $200_{DR}$ may operate to concurrently demote tracks from the cache 116. Because the multiple demote threads 134 are operating against separate demote ready LRU lists $200_{DR}$ there is no lock contention among the demote threads 134, and they each may in parallel demote tracks from the cache 116. Having multiple demote threads 134 concurrently demoting tracks increases the rate of demotion and reduces the likelihood that the rate of cache segment consumption, by the numerous running I/O threads 132 running on the processors $112_1$, $112_2 \ldots 112_m$, will exceed the rate of demotion and cause the cache 116 to run-out of free cache segments. Further the described embodiments minimize the number of demote threads 134 that are invoked to conserve processor resources by determining the number of demote threads 134 that are needed to maintain free cache segments based on the current number of free cache segments and different free cache segment thresholds.

Figure 8:
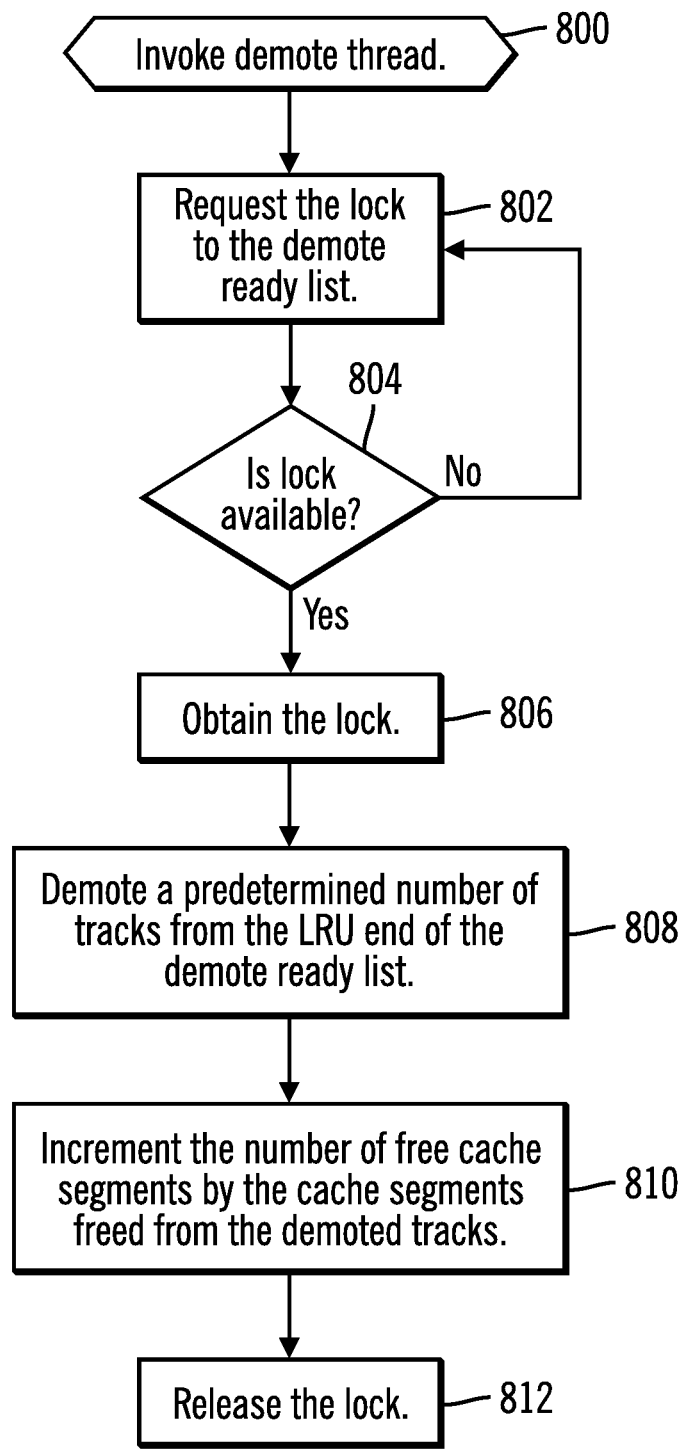
FIG. 8 illustrates an embodiment of operations of a demote thread to demote tracks from the cache.

FIG. 8 illustrates an embodiment of operations performed by one of the demote threads 134 executing on one of the processors $112_1$ to demote tracks from the cache 116. Upon the demote scheduler thread 140 invoking (at block 800) the demote thread 134, the demote thread 134 requests (at block 802) the lock 136 for the demote ready list $200_{DR}$ on the processor $112_i$ in which the demote thread 134 is running. If (at block 804) the lock 136 is not available, then the demote thread 134 returns to block 802 to wait for the lock 136. The demote ready list lock 136 may not be available if one of the I/O threads 132 is holding the lock 136 to access the demote ready LRU list $200_{DR}$ according to the operations of FIGS. 9a and 9b. If (at block 804) the lock is available, then the demote thread 134 obtains (at block 806) the lock and demotes (at block 808) a predetermined number of tracks from the LRU end 204 of demote ready LRU list $200_{DR}$, which may be the number M 410 or a different number. The number of free cache segments 402 is incremented (at block 810) by the cache segments freed from the demoted tracks. The lock 136 is then released (at block 812).

Figure 9A:
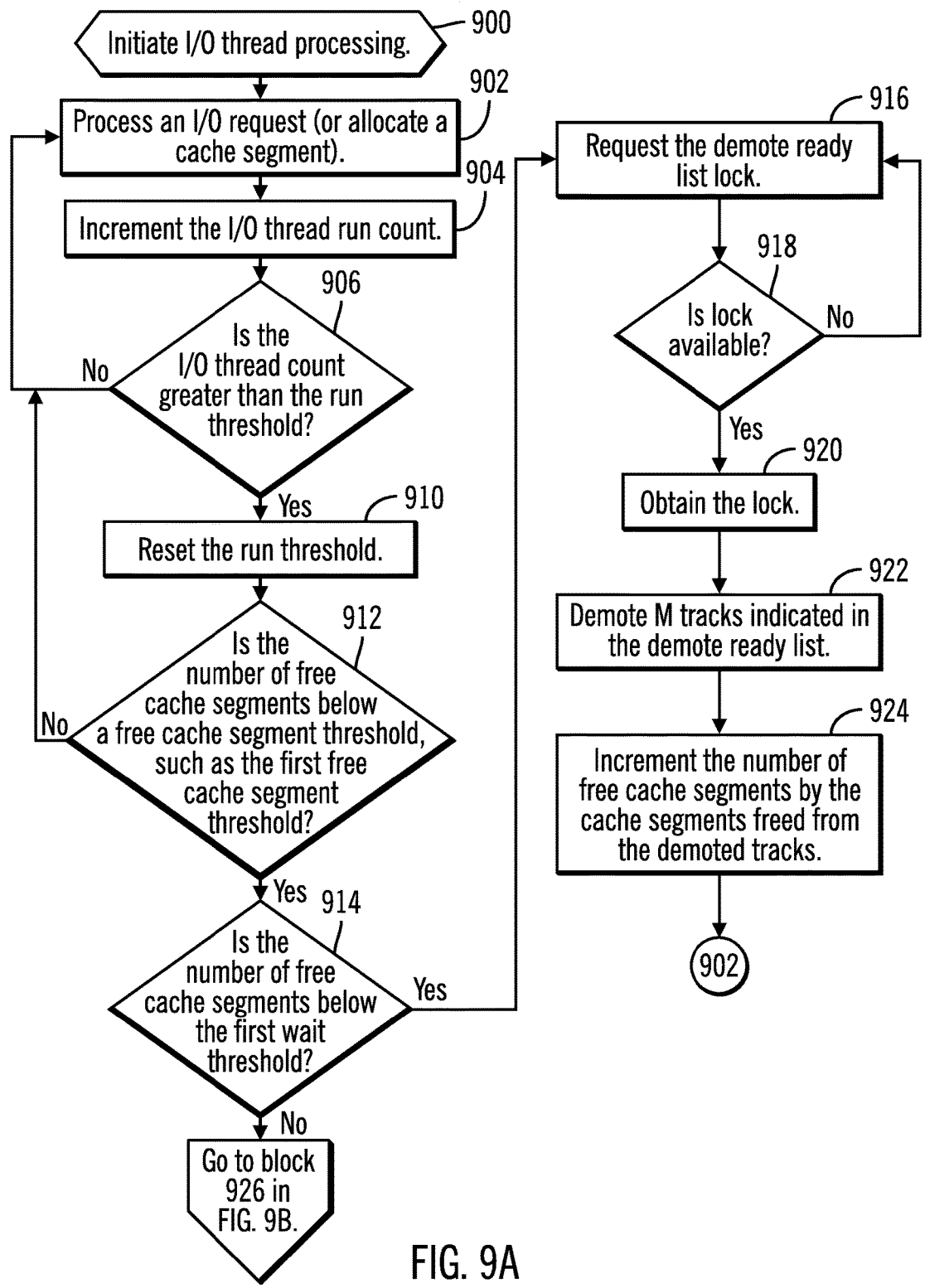
FIGS. 9*a* and 9*b* illustrate an embodiment of operations performed by an I/O thread processing I/O requests to demote tracks from the cache.
Figure 9B:
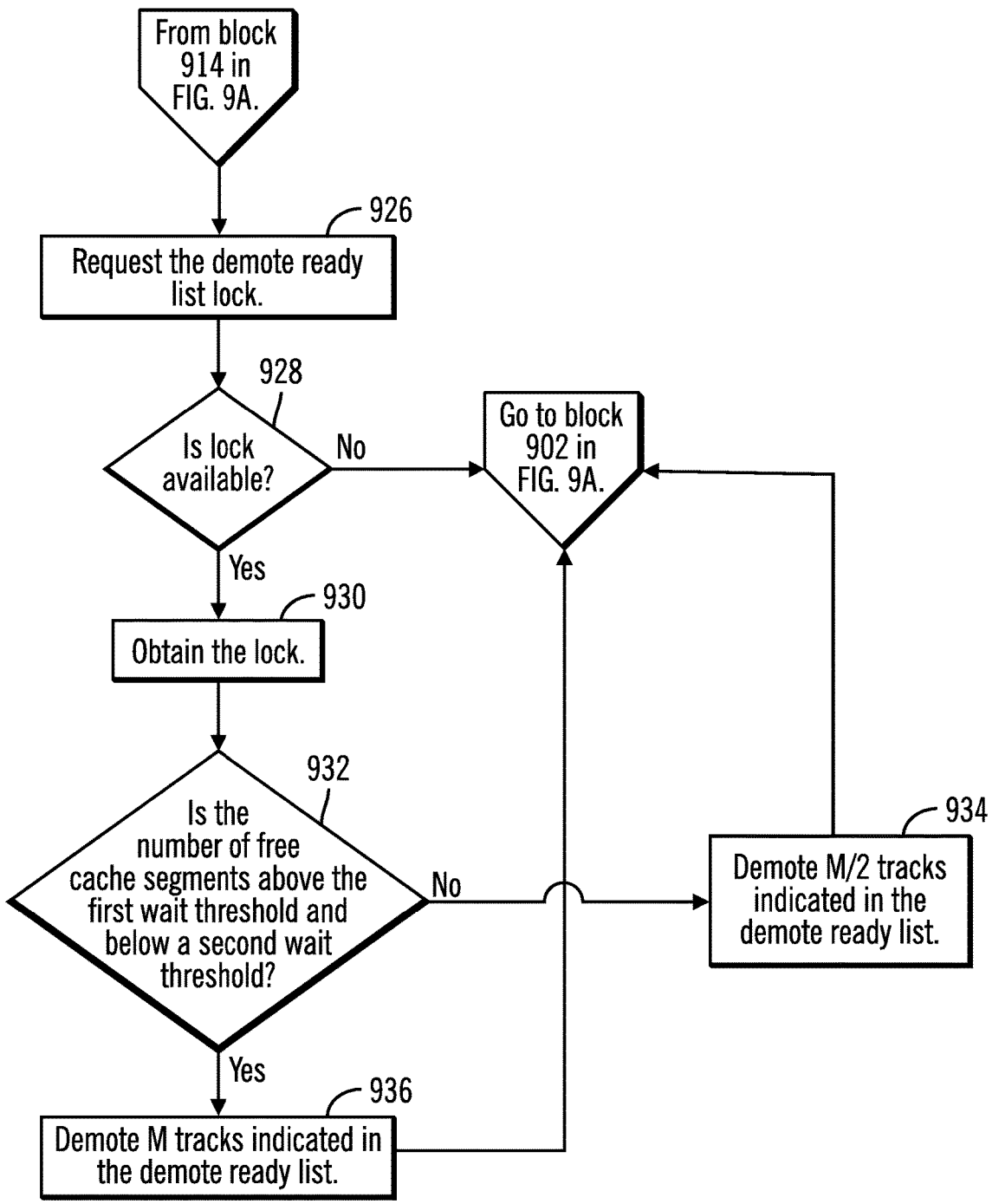

FIGS. 9a and 9b illustrate an embodiment of operations performed by one of the I/O threads 132 running on one of the processors $112_1$, $112_2 \ldots 112_m$ to process I/O requests from the hosts $102_1$, $102_2 \ldots 102_n$ and determine whether free tracks are sufficiently low such that the I/O thread 132 needs to be involved in demoting tracks. Upon initiating (at block 900) I/O thread processing, the I/O thread 132 processes (at block 902) an I/O request which may or may not involve allocating a new cache segment in the cache 116. The I/O thread 132 may have to obtain the active cache list lock 138 to access the active cache LRU list $200_A$ to serialize access among the multiple I/O threads 132 running on processor $112_i$. The I/O thread run count 502 is incremented (at block 904). In one embodiment, the I/O thread run count 502 is incremented each time the I/O thread processes an I/O request regardless if the request causes allocation of a cache segment. In another embodiment, the I/O thread run count 502 is only incremented if the I/O request causes a cache segment to be allocated, such as a read or write to a track not in the cache 116. If (at block 906) the I/O thread run count 502 is not greater (at block 906) than the count threshold 504, then control proceeds back to block 902 to process a next I/O request. If (at block 906) the I/O thread count 502 exceeds the count threshold 504, then control proceeds to block 910 and 912 for the I/O thread 132 to determine whether to switch from processing I/O requests to processing the demote ready LRU list $200_{DR}$ to demote tracks from the cache 116. In this way, cache consumption is reduced by directing the I/O thread 132 away from consuming cache segments and towards track demotion to free cache segments.

At block 910, the count threshold 504 is reset to zero. If (at block 912) the number of free cache segments 402 is not below a free cache segment threshold, such as the first free cache segment threshold 404 or some other threshold indicating the free cache segments are at a level sufficiently low to justify redirecting the I/O thread 132 to demoting tracks, then control returns to block 902 to continue processing I/O requests until the count threshold 504 number of I/O requests are processed. If (at block 912) the number of free cache segments 402 is below the free cache segment threshold, such as first free cache segment threshold 404, then the I/O thread 132 determines (at block 914) whether the number of free cache segments 402 is below the first wait threshold 412. If (at block 914) the number of free cache segments 402 is below the first wait threshold 412, the lowest threshold, then the level of free cache segments 402 is sufficiently low such that the I/O thread 132 needs to wait for the demote ready list lock 136, which removes the I/O thread 132 from consuming more cache segments.

If (at block 914) the number of free cache segments 402 is below the first wait threshold 412, then the I/O thread 132 requests (at block 916) the demote ready list lock 136. If (at block 918) the lock is not available, then control returns to block 916 where the I/O thread 132 waits for the lock 136 to become available. The lock would not be available if the demote thread 134 or another I/O thread 132 is currently accessing the demote ready LRU list $200_{DR}$ and demoting tracks. If (at block 918) the lock 136 is available, then the I/O thread 132 obtains (at block 920) the lock 136 and the predetermined number of tracks (M) 410 indicated in the demote ready LRU list $200_{DR}$ is demoted (at block 922) from the cache 116. The number of free cache segments 402 is incremented (at block 924) by the cache segments freed from the demoted tracks. Control then proceeds back to block 902 to continue processing I/O requests.

If (at block 914) the number of free cache segments 402 is not below the first wait threshold 412, i.e., the lowest threshold, then urgency for demotion is not at its highest and control proceeds to block 926 in FIG. 9b to request the to the demote ready list lock 136. If (at block 928) the lock is not available then the I/O thread 132 will not wait for the lock 136 and return to block 902 in FIG. 9a to continue processing I/O requests because the cache level is not sufficiently low, i.e., not below the first wait threshold 412, such that the I/O thread 132 needs to wait for the demote ready list lock 136 to become available. If (at block 928) the lock is available, then the I/O thread 132 obtains (at block 930) the lock 136 and determines (at block 932) whether the number of free cache segments 402 is above the first wait threshold 412 and below a second wait threshold 414. If so, then the I/O thread 132 demotes (at block 936) the predetermined number of tracks (M) 410 indicated in the demote ready LRU list $200_{DR}$. If (at block 932) the number of free cache segments 402 is above the second wait threshold 414, then the I/O thread demotes (at block 934) some portion of the predetermined number of tracks (M) 410, such as M/2 tracks. After demoting tracks at blocks 934 and 936, control returns to block 902 in FIG. 9a to continue processing I/O requests.

In a further embodiment, the I/O thread 132 may timeout from waiting for the lock if the lock is not available (at block 918) after some predetermined number of tries. Further, if the I/O thread is not to wait for the lock, such as at block 928, the I/O thread may perform a limited number of tries at block 928 for the lock before returning to processing I/O requests.

With the described operations of FIGS. 9a and 9b, a first determination is made as to whether tracks are sufficiently low, such as below the first free cache segment threshold 404, so that the I/O thread should be enlisted to help demote tracks from cache 116, which also diverts the I/O thread from consuming more cache segments, thus further contributing to increasing the number of free cache segments. After determining to enlist the I/O thread 132 for cache demotion, the I/O thread 132 must further determine the level or extent to which the number of free cache segments 402 is below the threshold 404 to determine whether the I/O thread should wait for the demote ready list lock 136 to become available. If the number of free cache segments 402 are not at the most critical or lowest level, then the I/O thread 132 may not wait for the lock I/O. If the lock is obtained when the I/O thread 132 will not wait for the lock, then the I/O thread may determine the number of tracks to demote based on the extent to which the number of free cache segments is below a higher second wait threshold 414. In this way, various free cache segment thresholds are used to determine whether to divert the I/O thread 132 away from I/O request processing and the extent to which the I/O thread is involved in demotion activity, such as whether the I/O thread 132 needs to wait for the lock and how many tracks will be demoted.

Further, since multiple I/O threads in the processors $112_1$, $112_2 \ldots 112_m$ will be determining whether to demote tracks after processing a predetermined number 504 of I/O requests, multiple I/O threads 132 in one processor $112_i$ may be attempting to access the demote ready list lock 136 to demote tracks from cache.

In certain embodiments, the operations of FIGS. 7, 8, and 9 may be concurrently performed, such that the demote scheduler thread 140 performs the operations of FIG. 7 to determine the number of demote threads 134 to invoke and the I/O threads may independently determine to demote tracks from the cache 116 according to the operations of FIGS. 9a and 9b, such that both I/O threads 132 and demote threads 134 on one processor $112_i$ may be attempting to obtain the lock 136 to access the demote ready LRU list $200_{DR}$ to demote tracks from the cache. Further, even if demote thread 134 and/or I/O thread 132 are waiting for the demote ready list lock 136, another thread 132 or 134 on the same processor $112_i$ and different processors $112_1$, $112_2 \ldots 112_m$ are concurrently demoting tracks. In this way, increasing the number of threads involved in demotion reduces the likelihood that a large number of I/O threads executing on the processors $112_1$, $112_2 \ldots 112_m$, far exceeding the number of demote threads 134 executing on the processors $112_1$, $112_2 \ldots 112_m$, will use all the free cache segments in the cache 116, thus causing all I/O threads to have to wait until cache segments are freed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, m, and n, are used herein to denote a variable number of instances of an element, which may represent the same or different values, and may represent the same or different value when used with different or the same elements in different described instances.

Figure 10:
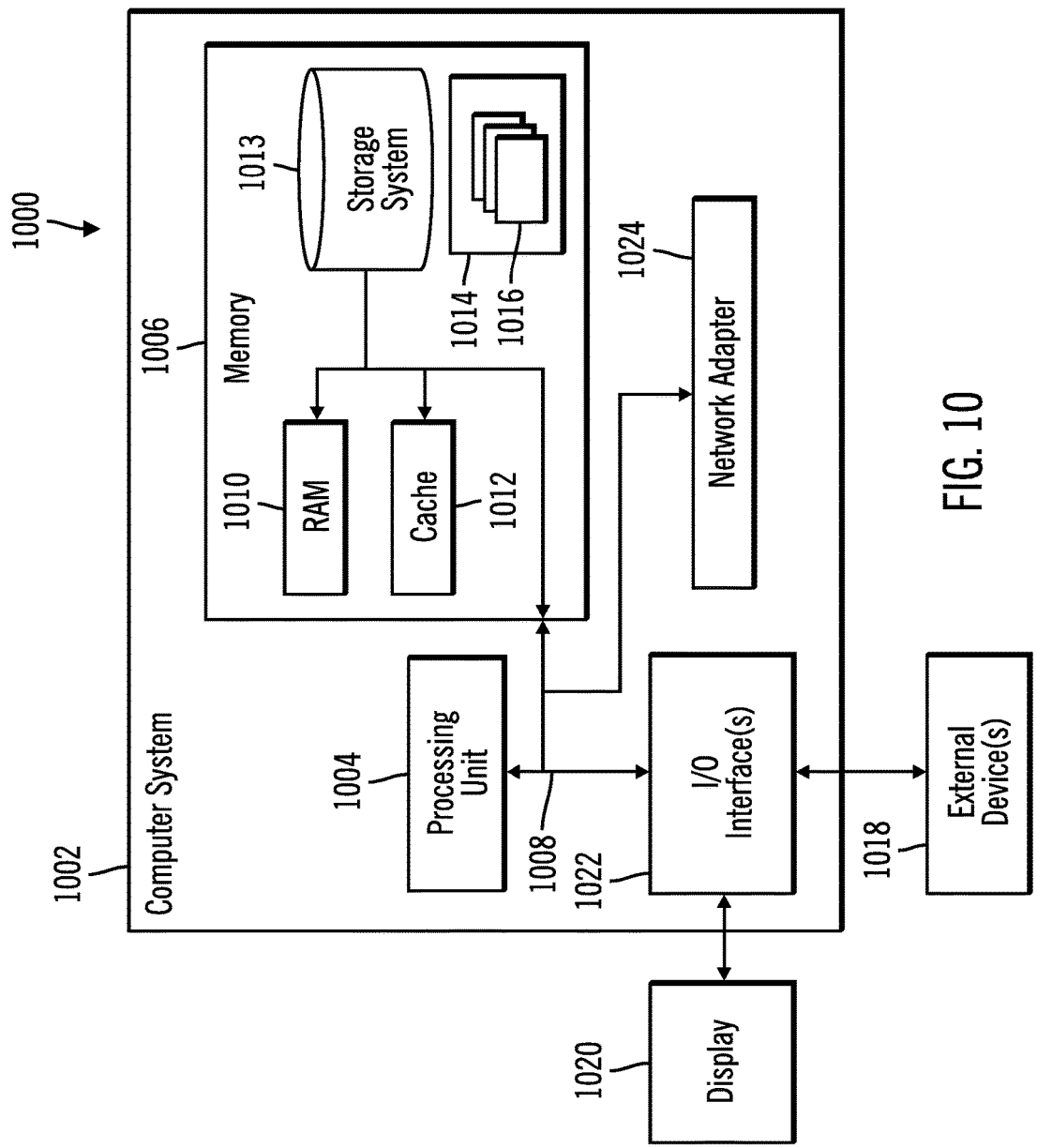
FIG. 10 illustrates a computing environment in which the components of FIG. 1 may be implemented

The computational components of FIG. 1, including the hosts $102_1, 102_2 \ldots 102_n$ and storage controller 104, may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for demoting tracks from a cache to a storage, the computer program product comprising a computer readable storage medium having computer readable program code embodied therein that when executed performs operations, the operations comprising:

determining a number of free cache segments in the cache;

determining a number of demote threads to invoke on one or more processors to process a demote ready list to demote tracks from the cache based on the number of free cache segments in the cache;

invoking the number of demote threads on the one or more processors; and incrementing the number of free cache segments in response to demoting the tracks from the cache.

2. The computer program product of claim 1, wherein the determining the number of demote threads to invoke comprises:

determining whether the number of free cache segments is below a threshold, wherein the number of demote threads is equivalent to a number of the processors, wherein the invoking the number of demote threads comprises invoking one demote thread on each of the processors to execute to process the demote ready list to demote the tracks from the cache.

3. The computer program product of claim 2, wherein the threshold comprises a first threshold, wherein the number of demote threads comprises a first number of demote threads, wherein the operations further comprise:
  determining whether the number of free cache segments is below a second threshold, greater than the first threshold, in response to determining that the number of free cache segments is not below the first threshold;
  determining a second number of demote threads to invoke as a function of the number of free cache segments in response to determining that the number of free cache segments is below the second threshold; and
  invoking the second number of demote threads on a plurality of the processors comprising less than all of the processors.

4. The computer program product of claim 3, wherein the function comprises a sliding scale based on the number of free cache segments.

5. The computer program product of claim 4, wherein according to the sliding scale, the second number of demote threads extends from two demote threads when the number of free cache segments is at the second threshold to a number of demote threads less than all of the processors as the number of free cache segments is closer to the first threshold.

6. The computer program product of claim 4, wherein the second number of demote threads to invoke comprises a total number of the processors times a ratio calculated by the number of free cache segments divided by a difference of the second threshold and the first threshold.

7. The computer program product of claim 3, wherein the operations further comprise:
  determining whether the number of free cache segments is below a third threshold, greater than the second threshold, in response to determining that the number of free cache segments is not below the second threshold, wherein the number of demote threads to invoke comprises one demote thread that is invoked on one processor to demote the tracks from the demote ready list.

8. A system for demoting tracks to a storage, comprising:
  a plurality of processors;
  a cache; and
  computer readable storage medium having computer readable program code embodied therein that when executed performs operations, the operations comprising:
    determining a number of free cache segments in the cache;
    determining a number of demote threads to invoke on one or more processors to process a demote ready list to demote tracks from the cache based on the number of free cache segments in the cache;
    invoking the number of demote threads on the one or more processors; and
    incrementing the number of free cache segments in response to demoting the tracks from the cache.

9. The system of claim 8, wherein the determining the number of demote threads to invoke comprises:
  determining whether the number of free cache segments is below a threshold, wherein the number of demote threads is equivalent to a number of the processors, wherein the invoking the number of demote threads comprises invoking one demote thread on each of the processors to execute to process the demote ready list to demote the tracks from the cache.

10. The system of claim 9, wherein the threshold comprises a first threshold, wherein the number of demote threads comprises a first number of demote threads, wherein the operations further comprise:
  determining whether the number of free cache segments is below a second threshold, greater than the first threshold, in response to determining that the number of free cache segments is not below the first threshold;
  determining a second number of demote threads to invoke as a function of the number of free cache segments in response to determining that the number of free cache segments is below the second threshold; and
  invoking the second number of demote threads on a plurality of the processors comprising less than all of the processors.

11. The system of claim 10, wherein the function comprises a sliding scale based on the number of free cache segments.

12. The system of claim 11, wherein according to the sliding scale, the second number of demote threads extends from two demote threads when the number of free cache segments is at the second threshold to a number of demote threads less than all of the processors as the number of free cache segments is closer to the first threshold.

13. The system of claim 11, wherein the second number of demote threads to invoke comprises a total number of the processors times a ratio calculated by the number of free cache segments divided by a difference of the second threshold and the first threshold.

14. The system of claim 10, wherein the operations further comprise:
  determining whether the number of free cache segments is below a third threshold, greater than the second threshold, in response to determining that the number of free cache segments is not below the second threshold, wherein the number of demote threads to invoke comprises one demote thread that is invoked on one processor to demote the tracks from the demote ready list.

15. A method for demoting tracks from a cache to a storage, comprising:
  determining a number of free cache segments in the cache;
  determining a number of demote threads to invoke on one or more processors to process a demote ready list to demote tracks from the cache based on the number of free cache segments in the cache;
  invoking the number of demote threads on the one or more processors; and
  incrementing the number of free cache segments in response to demoting the tracks from the cache.

16. The method of claim 15, wherein the determining the number of demote threads to invoke comprises:
  determining whether the number of free cache segments is below a threshold, wherein the number of demote threads is equivalent to a number of the processors, wherein the invoking the number of demote threads comprises invoking one demote thread on each of the processors to execute to process the demote ready list to demote the tracks from the cache.

17. The method of claim 16, wherein the threshold comprises a first threshold, wherein the number of demote threads comprises a first number of demote threads, further comprising:

determining whether the number of free cache segments is below a second threshold, greater than the first threshold, in response to determining that the number of free cache segments is not below the first threshold;

determining a second number of demote threads to invoke as a function of the number of free cache segments in response to determining that the number of free cache segments is below the second threshold; and invoking the second number of demote threads on a plurality of the processors comprising less than all of the processors.

18. The method of claim 17, wherein the function comprises a sliding scale based on the number of free cache segments.

19. The method of claim 18, wherein according to the sliding scale, the second number of demote threads extends from two demote threads when the number of free cache segments is at the second threshold to a number of demote threads less than all of the processors as the number of free cache segments is closer to the first threshold.

20. The method of claim 18, wherein the second number of demote threads to invoke comprises a total number of the processors times a ratio calculated by the number of free cache segments divided by a difference of the second threshold and the first threshold.

21. The method of claim 17, further comprising:

determining whether the number of free cache segments is below a third threshold, greater than the second threshold, in response to determining that the number of free cache segments is not below the second threshold, wherein the number of demote threads to invoke comprises one demote thread that is invoked on one processor to demote the tracks from the demote ready list.

* * * * *